(12) United States Patent
Böhning et al.

(10) Patent No.: US 12,212,857 B2
(45) Date of Patent: Jan. 28, 2025

(54) METHOD FOR COMMISSIONING A CAMERA CONTROL UNIT (CCU)

(71) Applicant: SCHÖLLY FIBEROPTIC GMBH, Denzlingen (DE)

(72) Inventors: Martin Böhning, Herzogsweiler (DE); Günter Grimm, Deisslingen (DE); Daniel Härter, Emmendingen (DE); Alexander Köhler, Freiburg (DE)

(73) Assignee: SCHÖLLY FIBEROPTIC GMBH, Denzlingen (DE)

( * ) Notice: Subject to any disclaimer, the term of this patent is extended or adjusted under 35 U.S.C. 154(b) by 0 days.

(21) Appl. No.: 17/441,890

(22) PCT Filed: Mar. 25, 2020

(86) PCT No.: PCT/EP2020/058446
§ 371 (c)(1),
(2) Date: Nov. 22, 2021

(87) PCT Pub. No.: WO2020/193671
PCT Pub. Date: Oct. 1, 2020

(65) Prior Publication Data
US 2022/0070368 A1 Mar. 3, 2022

(30) Foreign Application Priority Data
Mar. 27, 2019 (DE) .......... 102019107853.9

(51) Int. Cl.
*H04N 23/80* (2023.01)
*H04N 23/617* (2023.01)
*H04N 23/50* (2023.01)

(52) U.S. Cl.
CPC .......... *H04N 23/80* (2023.01); *H04N 23/617* (2023.01); *H04N 23/555* (2023.01)

(58) Field of Classification Search
None
See application file for complete search history.

(56) References Cited

U.S. PATENT DOCUMENTS 5,734,425 A * 3/1998 Takizawa ............. H04N 1/2137
348/E5.042
10,192,135 B2 * 1/2019 Krenzer ................. G06V 40/19
(Continued)

FOREIGN PATENT DOCUMENTS

EP 0667702 A2 8/1995
WO WO-2019161138 A1 * 8/2019 ............... G06F 8/65

OTHER PUBLICATIONS

Chinese Office Action dated Sep. 1, 2023 from corresponding Chinese Application No. 202080024389.7.
(Continued)

*Primary Examiner* — James M Hannett
(74) *Attorney, Agent, or Firm* — Grogan, Tuccillo & Vanderleeden, LLP (57) ABSTRACT

Method for commissioning a camera control unit (CCU) which defines a first processing path for video data, wherein an operating program for the CCU is loaded from a non-volatile program memory into a temporary memory of the CCU, and a check is carried out to determine whether an expansion unit is connected to the CCU, and, if so, at least a part of the operating program is loaded from a non-volatile program memory of the expansion unit into a temporary memory of the CCU.

10 Claims, 6 Drawing Sheets

(56) References Cited

U.S. PATENT DOCUMENTS

| | | | |
|---|---|---|---|
| 11,127,186 B2* | 9/2021 | Asaria | G06T 15/005 |
| 2003/0048374 A1 | 3/2003 | Minakuti et al. | |
| 2004/0201743 A1 | 10/2004 | Amling et al. | |
| 2008/0079836 A1 | 4/2008 | Nagata et al. | |
| 2013/0125107 A1 | 5/2013 | Bandakka et al. | |
| 2015/0279116 A1 | 10/2015 | Yachida | |
| 2017/0293999 A1 | 10/2017 | Tokui et al. | |

OTHER PUBLICATIONS

Korean Office Action dated Apr. 15, 2024, from corresponding Korean Application No. 10-2021-7034741.

* cited by examiner

METHOD FOR COMMISSIONING A CAMERA CONTROL UNIT (CCU)

CROSS REFERENCE TO RELATED APPLICATIONS

This application is a national stage of International Application No. PCT/EP2020/058446 filed on Oct. 1, 2020, which claims priority to German Patent Application No. 102019107853.9 filed Mar. 27, 2019, all of which is hereby incorporated by reference in its entirety.

BACKGROUND

The invention relates to a method for commissioning a camera control unit (CCU), wherein an operating program for the CCU is loaded from a non-volatile program memory into a temporary memory of the CCU.

DISCUSSION OF ART

Camera control units of this type are known, for example, from the field of endoscopy in which a video data stream is generated with a video endoscope or a camera head of an endoscope and is processed in the camera control unit for visualization or for other purposes.

It has been proposed to provide camera control units of this type with an expansion module in order to define a second video data processing path which implements, for example, a modified or expanded functionality.

The invention is concerned here with the task of enabling the alignment of the camera control unit and the expansion unit with one another.

This object is achieved according to the invention by a method with the features of claim 1.

The method described above is characterized accordingly, in particular, in that a check is carried out to determine whether an expansion unit is connected to the CCU, and in that at least a part of the operating program is loaded from a non-volatile program memory of the expansion unit into the temporary memory of the CCU if the expansion unit is connected to the CCU.

The advantage of the method according to the invention is that an expansion unit itself in each case brings with it the operating program which is necessary for its operation and which is loaded from it into the operating program of the camera control unit (CCU).

In particular, no modification of the operating program of the CCU therefore needs to be performed in the non-volatile program memory of the CCU.

This offers the advantage, in particular, that the camera control unit (CCU) can remain as an independent unit. As soon as the expansion unit has been removed, the originally present operating program is reloaded accordingly so that the usual function is again readily available.

The CCU does not therefore need to be fundamentally reconfigured for every conceivable expansion. The operating program of the CCU also has no need to be updated regularly in order to be compatible with new expansion units which are possibly never used.

This offers the further advantage, in particular, that approval issues can be dealt with more simply, since an excessive variety of different variants does not already need to be taken into account during the approval of the camera control unit. Since no permanent modifications are made to the CCU, the CCU retains its approval and/or certification.

BRIEF DESCRIPTION

In one embodiment of the invention, the operating program in the temporary memory of the CCU or individual parts or modules thereof are modified, supplemented or replaced by the operating program loaded from the expansion unit. The operating program of the CCU can therefore first be loaded from its non-volatile program memory. A check is then carried out within the operating program to determine whether the expansion unit is connected, and an operating program is then loaded therefrom which replaces, modifies or supplements parts of the operating program in the temporary memory.

In one advantageous embodiment, the CCU has a configurable image processing unit, in particular an FPGA. An FPGA of this type is usually configured during an initialization phase of the operating program by writing configuration data to the FPGA. In one embodiment of the invention, the configuration data for the configurable image processing unit are loaded from the non-volatile program memory of the expansion unit. This means that, for example, the operating program of the CCU remains unchanged and only the FPGA is configured according to the expansion unit.

In this embodiment, it may be advantageous if the check for the presence of an expansion unit is carried out during this initialization phase, in particular before the configuration data are loaded into the FPGA.

This is appropriate, particularly if the video data are processed primarily or exclusively in the FPGA.

In one embodiment of the invention, the check is carried out after the connection or disconnection of an expansion unit. The operating program of the CCU can be loaded during operation and can be exchanged or supplemented accordingly in the temporary memory. In particular, an FPGA can easily be reconfigured. This offers the advantage that an expansion unit can be connected during operation. This can be appropriate if a need for an expansion unit arises only during operation, for example during a surgical intervention with complications. A switch from a 2D to a 3D visualization, for example, could thus be performed during operation.

In one appropriate embodiment of the invention, the check is carried out before the operating program of the CCU is loaded.

It is advantageous here, in particular, if the operating program of the CCU is loaded entirely from the non-volatile program memory of the expansion unit. This means that the operating program is not loaded at all from the non-volatile memory of the CCU. In this way, an operating program is always loaded which is aligned overall precisely with the expansion unit and the functions associated therewith. It is not necessary to provide an expansion unit in any way in the operating program of the CCU, since the operating program is loaded in this case entirely from the expansion unit.

In this embodiment, it may be advantageous if the checking and loading of the operating program are performed during the boot procedure of the CCU, wherein a PXE protocol is used, and wherein the expansion unit makes the operating program available on a TFTP server. The check can be carried out, for example, by the boot loader of a microcontroller of the CCU.

The check to determine whether an expansion unit is connected can be performed by means of the boot loader which checks whether a TFTP server is present and whether said TFTP server provides a bootable operating program.

A second or alternative processing path for video data can be defined in the expansion unit by means of the invention. This can be used, for example, for 3D visualization or image overlay or for further image processing which is not possible with the CCU base unit.

The invention also comprises a camera control unit having an interface for connection to an expansion unit which is characterized in that the camera control unit has a temporary memory and is designed to load an operating program from a non-volatile program memory of a connected expansion unit into the temporary memory.

In particular, the camera control unit can be designed so that the loading is performed using a method according to the invention.

It is advantageous if the operating program is transferred via a data connection, in particular a wireless or wired interface.

The invention also comprises an expansion unit for connection to a camera control unit, characterized in that the expansion unit has a non-volatile program memory for an operating program for a camera control unit and an interface for a data connection via which the operating program is transferable to a camera control unit.

The invention also comprises an image processing arrangement having at least one camera control unit, in particular a camera control unit according to the invention, and at least one expansion unit, in particular an expansion unit according to the invention, which are interconnected via a data connection and a video signal line, wherein the expansion unit has a non-volatile program memory containing an operating program which is loadable via the data connection into a temporary memory of the camera control unit, in particular using a method according to the invention.

The invention is explained in detail below on the basis of a preferred example embodiment with reference to the attached drawings.

DETAILED DESCRIPTION

Figure 1:
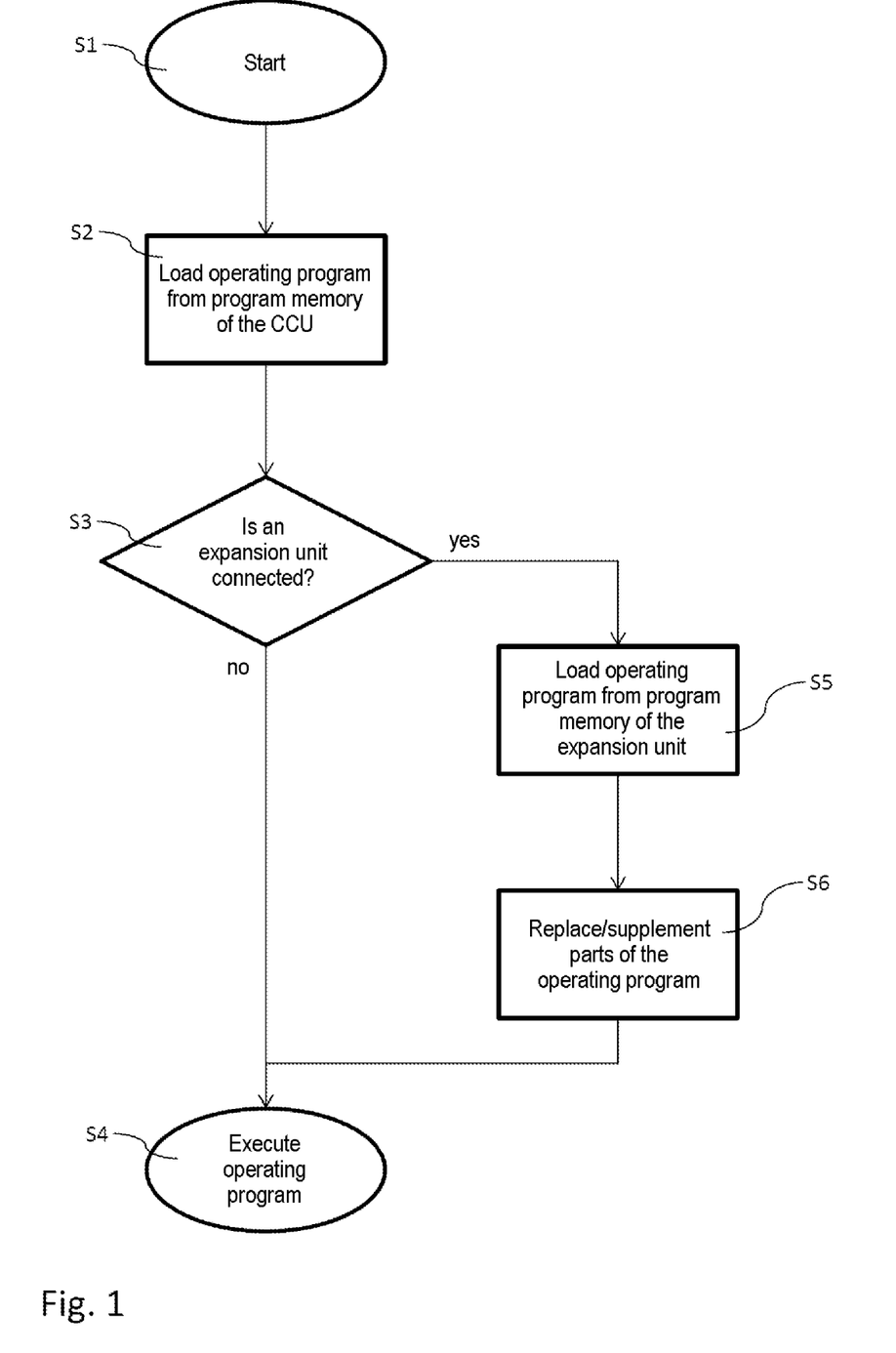
FIG. 1 shows a flow diagram of a method according to the invention.

FIG. 1 shows a flow diagram of a method according to the invention for commissioning a camera control unit 1. The camera control unit is explained in detail, for example, in FIG. 5.

According to the method shown in FIG. 1, following the start S1 of the camera control unit (base unit) 1, an operating program is first loaded S2 from a non-volatile program memory 2 of the base unit 1. This program memory 2 can, for example, be a ROM, PROM, EPROM, flash, a hard disk or a removable storage medium, such as a CD-ROM. The operating program is loaded into a temporary memory 3 of the base unit 1. The base unit 1 normally has a microcontroller 4 or microprocessor which executes the operating program.

The operating program is executed once it is loaded. Within the operating program, for example in an initialization phase, a check is carried out S3 to determine whether an expansion unit 5 is connected to the base unit 1. This check can be performed, for example, by evaluating a switch which is activated when the expansion unit 5 is connected, or via a control command at an interface. In addition, numerous further possibilities are known in the prior art. If it is established that no expansion unit 5 is connected, the operating program is further executed S4.

However, if an expansion unit 5 is connected to the base unit 1, an operating program is loaded S5 from a non-volatile program memory 6 of the expansion unit 5 into the temporary memory 3 of the base unit 1. This operating program of the expansion unit 5 is then adapted to the use with the expansion unit 5. In order to adapt the base unit 1 to the expansion unit 5, at least parts of the operating program of the base unit 1 are replaced, supplemented or modified S6. This can take place, for example, in the temporary memory 3 of the base unit 1 or, for example, in the working memory of the microcontroller. Modules, for example, can be loaded or supplemented to activate the expansion module 5, or algorithms can be exchanged for the image processing. It is crucial here that the expansion unit 5 itself contains the operating program which it needs and that said operating program is temporarily loaded into the base unit 1. The loading procedure is repeated during each activation of the base unit. If the expansion unit 5 is then removed once more, the usual functionality of the base unit 1 is available, since the unmodified, original operating program of the base unit 1 is then loaded and executed.

It is advantageous here that subsequent expansion units 5 do not need to be taken into consideration at the time of manufacture of the base unit 1.

Figure 2:
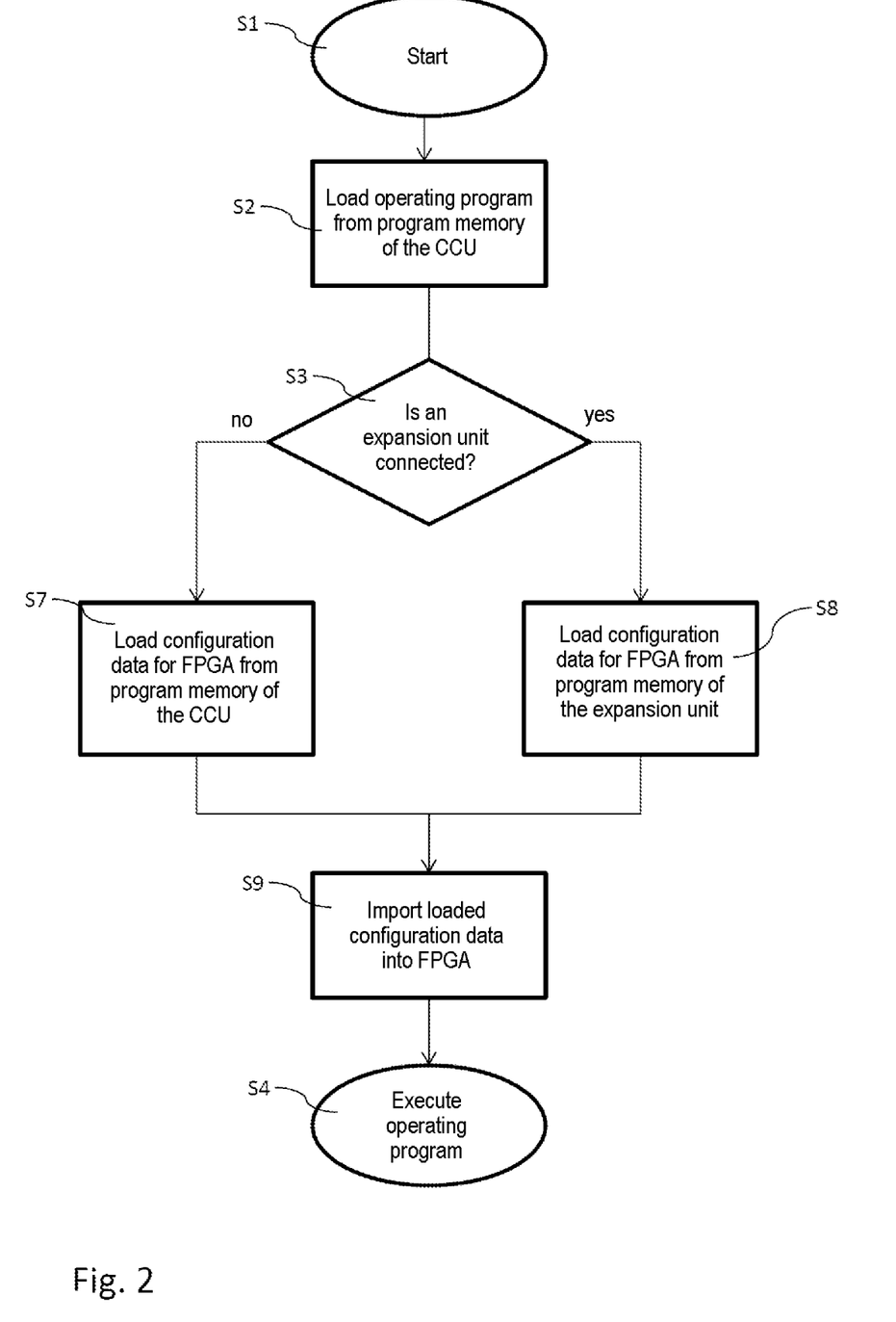
FIG. 2 shows a flow diagram of a further method according to the invention.

The method shown in FIG. 2 is explained with reference to FIG. 6. Here, the camera control unit 1, i.e. the base unit, has an FPGA 7 as a video processing unit. Following the start S1, as in FIG. 1, the operating program is first loaded from a non-volatile program memory 2 of the base unit 1 into a temporary program memory 3 of the base unit 1.

The check is then carried out S3 to determine whether an expansion unit 5 is connected to the base unit 1. If no expansion unit 5 is connected, the configuration data for the FPGA 7 are loaded S7 from the non-volatile program memory 2 of the base unit 1. Finally, the configuration data are written S9 to the FPGA 7, for example by the microcontroller 4. The base unit 1 defines a first processing path for video data with the FPGA 7. The operating program is then executed in S4.

However, if an expansion unit 5 is connected, the configuration data for the FPGA 7 are loaded S8 instead from the non-volatile program memory 6 of the expansion unit 5. These alternative configuration data are then written S9 to the FPGA 7 and executed S4. In this embodiment, the configuration data for the FPGA 7 are part of the operating program within the meaning of the invention.

In this embodiment, it can be advantageous if the video processing is performed entirely by the FPGA 7. For this reason, it may suffice simply to adapt the configuration data of the FPGA to the modified functionality of the expansion unit 5

Figure 3:
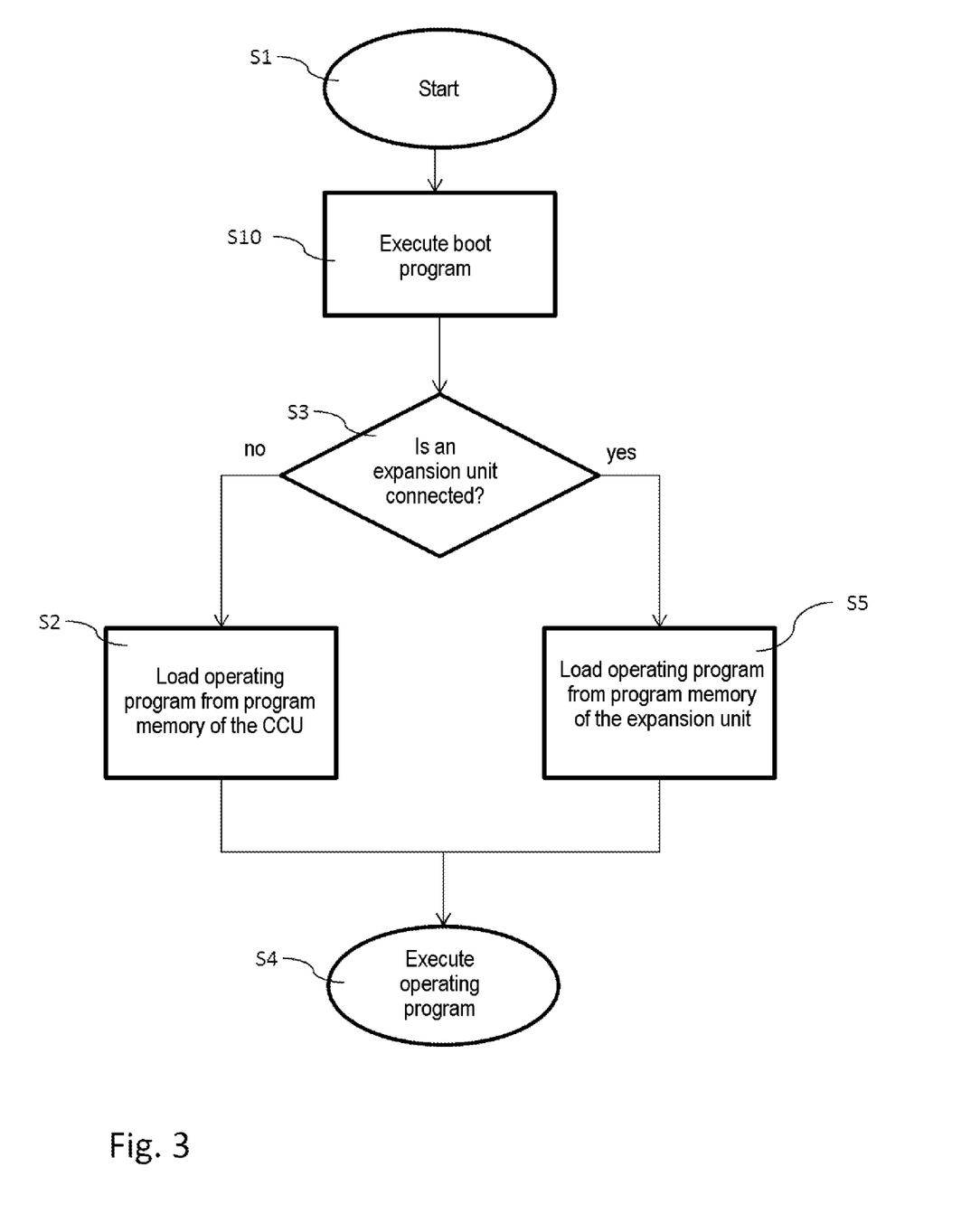
FIG. 3 shows a flow diagram of a further method according to the invention.

Finally, FIG. 3 shows a method which executes S10 a boot program following the start S1 of the base unit 1. This boot procedure S10 takes place before the loading of an operating program. During the boot procedure, a check is carried out S3 to determine whether an expansion unit 5 is connected. This checking procedure is similarly carried out before an operating program is loaded. The boot program S10 can be implemented, for example, in a boot loader of the microcontroller 4.

If no expansion unit 5 is connected, the operating program of the base unit 1 is loaded S2 from the non-volatile program memory 2 of the base unit 1 into a temporary memory 3 of the base unit 1. The operating program is then executed S4.

However, if an expansion unit 5 is connected, the operating program is loaded S5 from the non-volatile program memory 6 of the expansion unit 5 into the temporary memory 3 of the base unit 1. This operating program is then executed. In this embodiment, the operating program is then loaded entirely from the expansion unit. This is particularly advantageous since the operating program can thus be very well adapted to the expansion unit, and the operating program of the base unit does not require any provisions whatsoever for possible expansion units.

The expansion unit 5 can provide the operating program, for example by means of a TFTP server. In this case, the base unit 1 can access the TFTP server directly from the boot program, for example via a PXE boot protocol, in order to load the operating program from the expansion unit 5.

Figure 4:
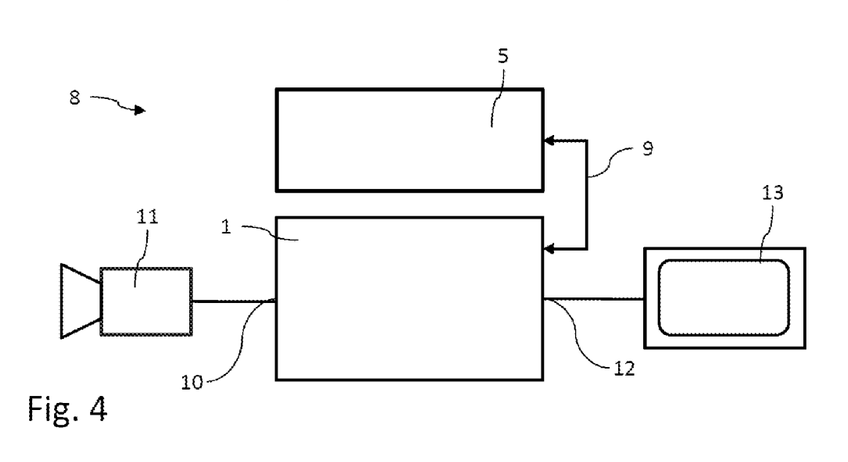
FIG. 4 shows a block diagram of an arrangement having a camera control unit and an expansion unit to carry out a method according to the invention.

FIG. 4 shows an arrangement 8 consisting of a camera control unit as the base unit 1 and an expansion unit 5 which is connected to the base unit 1. The connection can be set up, for example, via a data connection 9. This data connection 9 can be a standard interface, such as a USB or Ethernet, or a wireless interface, such as Wi-Fi or Bluetooth. However, a simple data interface can also be configured at microcontroller level, such as I2C or the like.

In this arrangement 8, the base unit 1 has a video input 10 to which a camera 11, for example a video endoscope or an endoscope having a camera head, is connected. The base unit 1 further has a video output 12 to which a monitor 13 is connected. The base unit 1 thus defines a first processing path for video data. The expansion unit 5 defines a second or alternative processing path for video data.

It is possible for the expansion unit 5 to receive the video data of the camera 11 from the base unit as unprocessed, partially processed or processed. The expansion unit 5 can then subject the video data to further processing steps.

Figure 5:
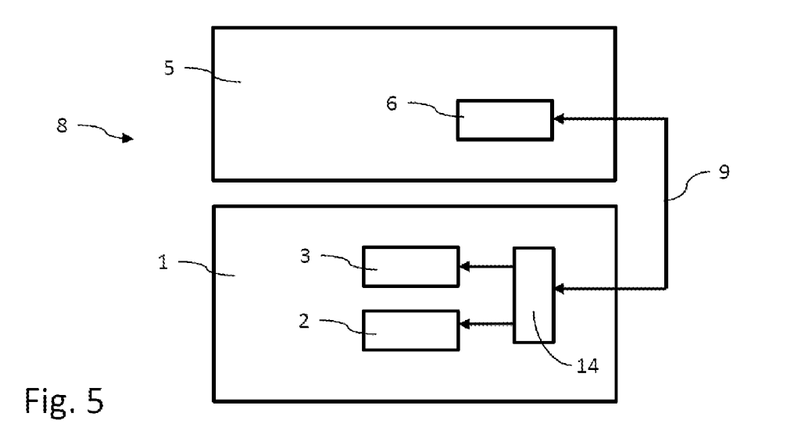
FIG. 5 shows a further block diagram of the arrangement shown in FIG. 4.

FIG. 5 shows a different view of the arrangement 8 shown in FIG. 4. The base unit 1 has a non-volatile program memory 2 in which the operating program of the base unit 1 is stored. The base unit 1 further has a temporary memory 3 into which an operating program is temporarily loaded. This temporary memory 3 can be a flash memory, an SRAM or the working memory of a microcontroller 4 (see FIG. 6). The expansion unit 5 similarly has a non-volatile program memory 6 in which the operating program of the expansion unit 5 is stored. When the base unit 1 is started, the operating program is loaded by a boot loader 14 from either the base unit 1 or the expansion unit 5 into the temporary memory 3 of the base unit 1 according to the method shown in FIG. 3.

Figure 6:
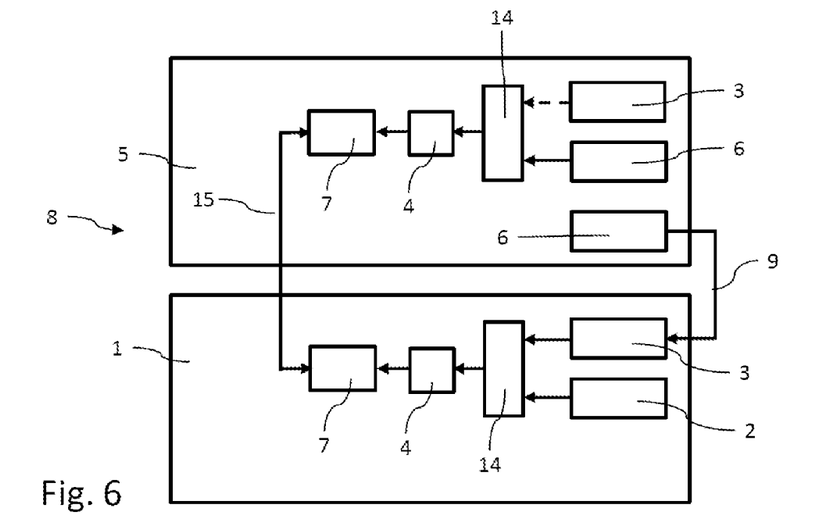
FIG. 6 shows a further block diagram of the arrangement shown in FIG. 4.

FIG. 6 shows a further view of the arrangement 8. The base unit 1 further has a microcontroller 4 and an FPGA 7 which is connected to the microcontroller 4. According to the method shown in FIG. 2, the FPGA 7 is configured by the microcontroller 4, wherein, depending on the presence of an expansion unit 5, the configuration data are loaded from the non-volatile program memory 2 of the base unit or from the non-volatile program memory 6 of the expansion unit 5.

The expansion unit 5 similarly has a microcontroller 4 which has a separate operating program. The operating program is stored in a separate non-volatile program memory 6 and is loaded on start-up into a temporary memory 3 of the expansion unit 5. The expansion unit 5 similarly has an FPGA 7 for video processing.

The two FPGAs 7 are interconnected via a separate video signal connection 15. Depending on the application, the FPGA 7 of the base unit 1 can be configured by the operating program of the expansion unit 5 in such a way that it forwards video signals unprocessed or preprocessed within defined limits to the FPGA 7 of the expansion unit. The FPGA 7 of the base unit 1 can thus be configured, for example for a 3D image presentation, in such a way that it processes e.g. the left image channel, and the FPGA 7 of the expansion unit processes the right image channel. However, numerous other applications are possible, so that the invention is not intended to be restricted to a specific type of video processing.

A separate video signal interface, for example, such as an SDI interface, can be present for the video signal transmission to the expansion unit. However, an existing interface, such as a DVI or HDMI interface of the base unit, can also be reprogrammed by the expansion operating program in such a way that a non-interface-specific video signal transmission takes place. The base unit does not then require a separate interface. A video output 12 otherwise normally provided in order to connect a monitor can be used to exchange video signals between the two FPGAs.

Figure 7:
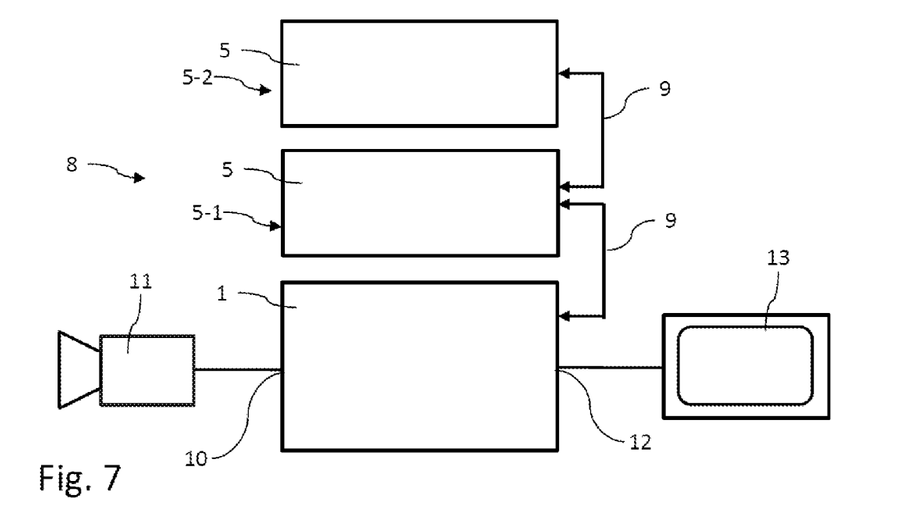
FIG. 7 shows a block diagram of an arrangement having one camera control unit and two expansion units to carry out a method according to the invention.

FIG. 7 shows an alternative arrangement 8 with one base unit and two expansion units 5, wherein the expansion units 5 are arranged in cascaded form so that only one expansion unit 5 is connected directly to the base unit 1. The second expansion unit 5-2 is therefore connected to the first expansion unit 5-1. According to FIG. 8, the arrangement 8 otherwise corresponds to the arrangement shown in FIG. 6.

Figure 8:
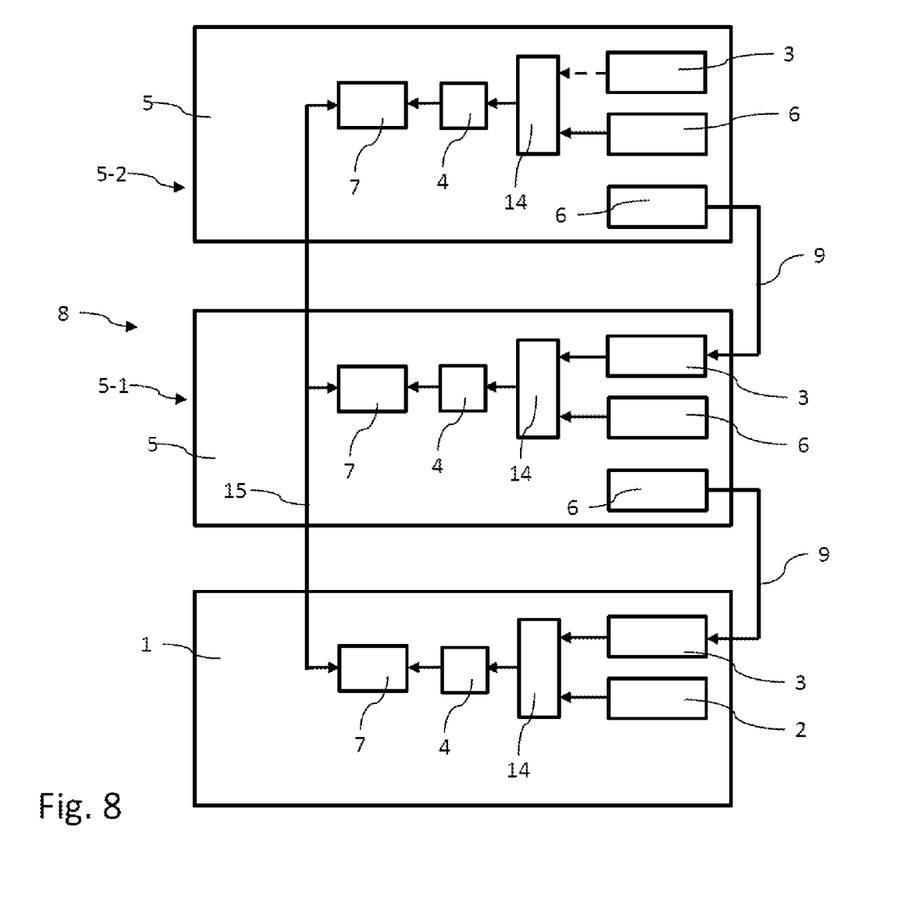
FIG. 8 shows a further block diagram of the arrangement shown in FIG. 7.

It is thus possible, for example, for the first expansion unit 5-1 to load an operating program using a method according to the invention from the second expansion unit 5-2. The first expansion unit 5-1 similarly has a temporary memory 3 for this purpose, while the base unit loads an operating program using a method according to the invention from the first expansion unit 5-1.

Figure 9:
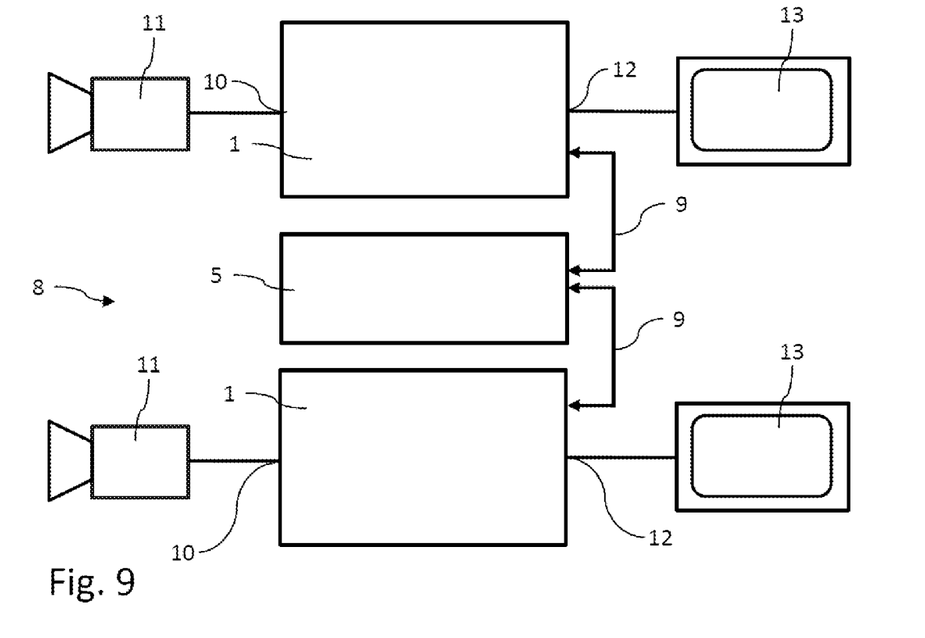
FIG. 9 shows a block diagram of an arrangement having two camera control units, one expansion unit and two monitors to carry out a method according to the invention.

FIG. 9 shows an alternative arrangement 8 with two base units 1 and an expansion unit 5 which is connected between the two base units 1. In this arrangement 8, both base units 1 can load the operating program according to the invention from the expansion unit 1.

In the example, each base unit 1 has a video input 10 and a video output 12 to which a camera 11 or a monitor 13 are in each case connected. This arrangement is suitable, for example, for picture-in-picture presentation or for image overlay in different spectral ranges, e.g. fluorescence image or normal image.

Figure 10:
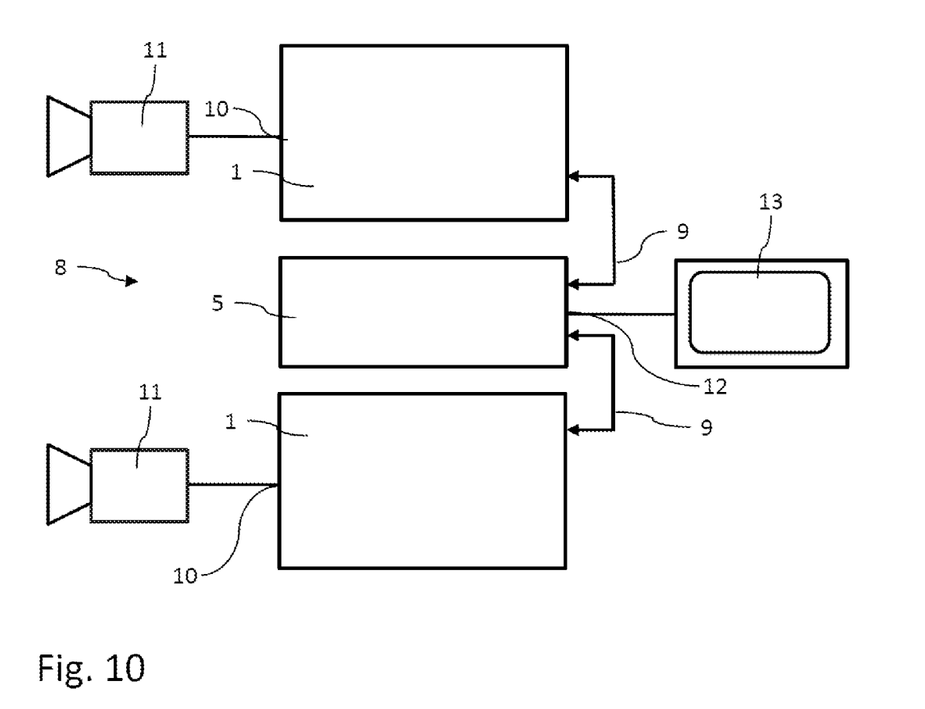
FIG. 10 shows a block diagram of an arrangement having two camera control units, one expansion unit and one monitor to carry out a method according to the invention.

FIG. 10 shows an arrangement 8 similar to FIG. 9. Here, however, the expansion unit 5 has a video output 12 to which a single monitor 13 is connected. A 3D presentation, for example, is therefore possible.

The invention claimed is:

1. A method for commissioning a camera control unit (CCU) which defines a first processing path for video data, wherein a check is carried out to determine whether an expansion unit is connected to the CCU, in that if an expansion unit is connected to the CCU, wherein the expansion unit itself contains an operating program which it needs to operate and the operating program is loaded from a non-volatile program memory of the expansion unit into a temporary memory of the CCU, and the operating program for the CCU is adapted to operate the expansion unit by modifying, supplementing or replacing an original operating program of the CCU, or individual parts or modules thereof, with the operating program loaded from the expansion unit and     the expansion unit defines a second or alternative processing path for video data, which is used for 3D visualization or for image overlay or for further image processing that is not possible with the first processing path offered by the CCU such that the operating program of the CCU does not need to be updated regularly to be compatible with the expansion unit.

2. The method as claimed in claim 1, wherein the CCU has a configurable image processing unit, in particular an FPGA, and in that the operating program loaded from the non-volatile program memory of the expansion unit contains at least the configuration data for the configurable image processing unit.

3. The method as claimed in claim 1 wherein the check is carried out before the operating program is loaded and/or after an expansion unit is connected or disconnected.

4. The method as claimed in claim 1, wherein the operating program of the CCU is loaded entirely from the non-volatile program memory of the expansion unit.

5. The method as claimed in claim 4, wherein the loading of the operating program is performed during the boot procedure of the CCU, wherein a PXE protocol is used, and wherein the expansion unit makes the operating program available on a TFTP server.

6. The method as claimed in claim 1, wherein the expansion unit defines a second or alternative processing path for video data.

7. A camera control unit having an interface for connection to an expansion unit wherein the camera control unit has a temporary memory and is designed to load an operating program from a non-volatile program memory of a connected expansion unit into the temporary memory, in particular using a method as claimed in claim 1.

8. The camera control unit as claimed in claim 7, wherein the operating program is transferred via a data connection, in particular a wireless or wired interface.

9. An expansion unit for connection to a camera control unit, in particular as claimed in claim 7, wherein the expansion unit has a non-volatile program memory for an operating program for a camera control unit and an interface for a data connection via which the operating program is transferable to a camera control unit.

10. An image processing system having at least one camera control unit as claimed in claim 7, and at least one expansion unit, which are interconnected via a data connection and a video signal line, wherein the expansion unit has a non-volatile program memory containing an operating program which is loadable via the data connection into a temporary memory of the camera control unit.

* * * * *